United States Patent
Li

(10) Patent No.: US 12,469,289 B1
(45) Date of Patent: Nov. 11, 2025

(54) VIDEO GENERATION USING A HEADLESS BROWSER

(71) Applicant: Zoox, Inc., Foster City, CA (US)

(72) Inventor: Hao Li, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 690 days.

(21) Appl. No.: 17/354,537

(22) Filed: Jun. 22, 2021

(51) Int. Cl.
```
G06V 20/40      (2022.01)
G06F 9/54       (2006.01)
H04L 67/00      (2022.01)
H04N 23/695     (2023.01)
H04N 23/951     (2023.01)
```

(52) U.S. Cl.
CPC ............. G06V 20/47 (2022.01); G06F 9/547 (2013.01); H04L 67/00 (2013.01); H04N 23/695 (2023.01); H04N 23/951 (2023.01); *G06V 2201/07* (2022.01)

(58) Field of Classification Search
CPC .... H04L 67/00; G06V 20/47; G06V 2201/07; H04N 23/695; H04N 23/951; G06F 9/547
See application file for complete search history.

(56) References Cited

U.S. PATENT DOCUMENTS

| | | | |
|---|---|---|---|
| 9,720,888 B1 * | 8/2017 | Jain ...................... | G06F 16/9577 |
| 10,198,408 B1 * | 2/2019 | Commisso ............ | G06F 40/143 |
| 10,986,504 B1 * | 4/2021 | Smith .................. | G06Q 20/108 |
| 11,803,695 B1 * | 10/2023 | Li .......................... | G06F 40/166 |
| 2008/0201326 A1 * | 8/2008 | Cotter ................... | G06F 16/951 |
| | | | 707/999.005 |
| 2014/0380145 A1 * | 12/2014 | Wilsher ................. | H04L 51/18 |
| | | | 715/234 |
| 2017/0011441 A1 * | 1/2017 | Buezas ............... | G06Q 30/0641 |
| 2017/0034244 A1 * | 2/2017 | Eschbach .............. | H04L 67/06 |
| 2017/0251217 A1 * | 8/2017 | Balasubramaniam ....... |  |
| | | | H04N 19/436 |
| 2018/0332132 A1 * | 11/2018 | Sampath ............... | H04L 67/561 |
| 2019/0295030 A1 * | 9/2019 | Candeloro, Jr. ..... | G06Q 10/087 |
| 2019/0383631 A1 * | 12/2019 | Bigio .................... | G06V 20/59 |
| 2020/0007934 A1 * | 1/2020 | Ortiz ................ | H04N 21/25883 |
| 2020/0164509 A1 * | 5/2020 | Shults ................... | G05B 19/02 |
| 2020/0210510 A1 * | 7/2020 | Corley ............... | G06F 16/9558 |
| 2020/0372184 A1 * | 11/2020 | Meirosu ................ | H04L 9/3247 |
| 2021/0067743 A1 * | 3/2021 | Hodge .................. | H04N 7/181 |
| 2021/0216794 A1 * | 7/2021 | Gupta .................. | G06V 20/584 |
| 2022/0280071 A1 * | 9/2022 | Katsu ................... | A61B 5/7435 |
| 2023/0017627 A1 * | 1/2023 | Goodrich ............. | G06F 1/1643 |

\* cited by examiner

*Primary Examiner* — John A Follansbee
*Assistant Examiner* — Zonghua Du
(74) *Attorney, Agent, or Firm* — Lee & Hayes, P.C.

(57) ABSTRACT

Techniques for capturing videos of content displayed and/or generated by a web-based application are described herein. The videos may be captured by automating screenshots of the content within a headless browser at a fixed frame interval. The headless browser may be used to automate control of the web-based application to generate the content and capture screenshots of the content as the content would appear if the web-based application was being accessed through a traditional web browser graphical user interface. The screenshots may be captured at specific frame intervals while the content is being generated. Additionally, the headless browser or a server executing headless browser may wait for the web-based application to load individual frames of the content before capturing screenshots. The captured screenshots may then be combined to generate a video of the content.

20 Claims, 8 Drawing Sheets

VIDEO GENERATION USING A HEADLESS BROWSER

BACKGROUND

Web-based applications allow users to interact with a remote server through a web browser interface. These applications have increased in popularity in recent years, in many cases replacing traditional desktop applications. Web-based applications offer advantages over traditional desktop applications, including users not having to install additional software, developers not having to write multiple versions of the same application for different operating systems, and more. Additionally, since web-based applications are run on a web server, these applications have access to resources that may not otherwise be available to traditional desktop applications. One popular use of web-based applications is to display (e.g., stream) high-definition content, such as a live video feed on a dynamic web application. However, recording videos of this high-definition content displayed by a web-based application is challenging.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
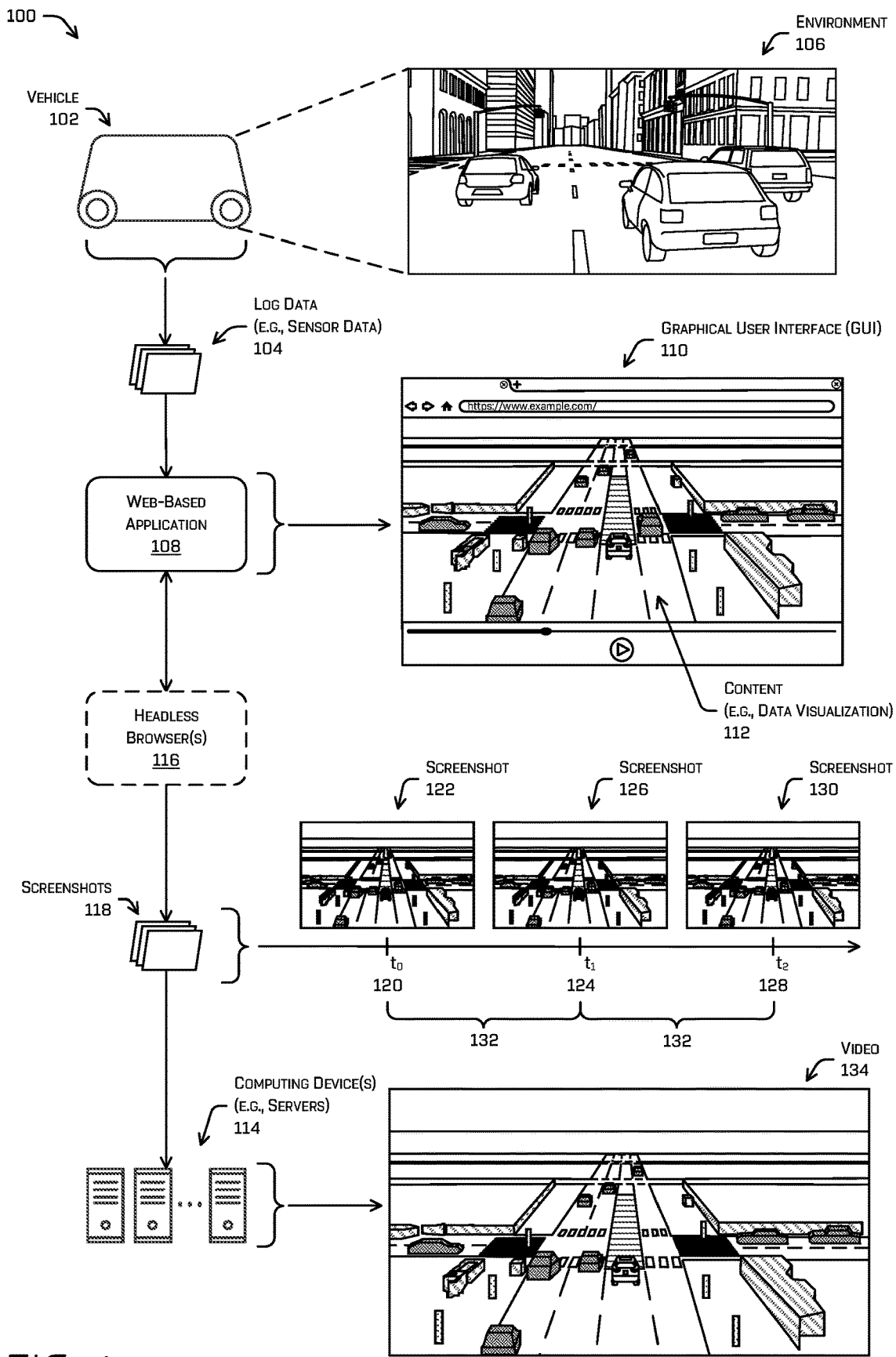
FIG. 1 is a pictorial flow diagram illustrating an example process in which a web-based application is generating and/or displaying content based on log data, and a headless browser is used to capture a video of the content.

As discussed above, web-based applications have increased in popularity in recent years, likely due to their advantages over traditional desktop applications, including users not having to install additional software, developers not having to write multiple versions of the same application for different operating systems, and more. Additionally, since web-based applications are run on a web server, these applications have access to resources that may not otherwise be available to traditional desktop applications. One popular use of web-based applications is to display (e.g., stream, generate, etc.) high-definition content, such as streaming a live video feed on a dynamic web application. However, recording videos of this content can be challenging.

For instance, one way of recording a video of content generated and/or displayed by a web-based application is to install a software extension for a web browser. However, this process may be tedious and/or error prone due to real-time variance associated with generating/displaying the content (e.g., frame inaccuracies from capturing frames at imperfect time intervals, resulting in a recorded video that is distorted from the original content). Another possible way of recording a video on the web may be accomplished using a developed application programming interface (API). These APIs work by attaching the recorder to a web canvas and recording the real-time bytes of the content into a buffer. However, these APIs have limited configurability and produce videos of limited quality. These APIs are also subject to the real-time performance variances described just above.

Accordingly, this application is directed to improved techniques for recording content (e.g., video feeds, data visualizations, and the like) displayed and/or generated by a web-based application (e.g., dynamic web application) by automating screenshots of the content within a headless browser at a fixed frame interval. For instance, a headless browser (e.g., a web browser without a graphical user interface that is executed via a command-line interface or using network communication) may be used to automate control of a web-based application to generate content. While the headless browser is automating control of the application, the headless browser may capture image data (e.g., screenshots) representing a browser window of the web-based application. In other words, when the headless browser captures image data, the image data may represent what would be shown by the web-based application if the application were being accessed through a traditional web browser graphical user interface. The headless browser may capture the image data screenshots at respective instances of time (e.g., intervals) while the content is being generated and after individual frames have finished loading, and each screenshot captured by the headless browser may be associated with a timestamp. In this way, the screenshots may be combined in a time-ordered manner (e.g., pieced together one after another based on their respective timestamps) to generate a video of the content with less overhead than the data used by the web-based application to generate the content. In other words, rather than having to use a web-based application to generate the viewable content based on stored data, the generated/stored video of the content may be viewed instead.

Capturing videos of content generated by web-based applications according to the techniques described above and herein have several advantages over prior techniques. For instance, screenshots captured by a headless browser can include an entire web page window, whereas other technologies may only capture an individual web canvas. As such, if the content to be recorded includes multiple canvases within a single browser window (e.g., multiple sub-windows within a single browser window), only a single recording of the web page window is necessary. Additionally, because headless browsers are more configurable than the prior techniques, the width, height, pixel ration, etc. of screenshots may be set such that 4K quality images can be captured, thus resulting in a 4K quality video.

Another advantage offered by capturing videos of content generated by web-based applications using the headless browser techniques described herein is the fine-grained control associated with generating video content. For instance, the headless browser allows monitoring of network requests such that it may be determined, before taking a screenshot, whether data has been loaded by the web-based application, whether user interface elements have been successfully rendered by the web-based application, and the like. This is more reliable than recording dynamic content in real-time with a possibility that the web-based application might stutter (e.g., while generating or loading content), leading to real-time performance variances in the captured video.

Yet another advantage of capturing videos according to the techniques described herein is that the techniques are highly parallelizable. As such, depending on the size (e.g., length, quality, etc.) of a video that is to be generated, the content to be recorded can be split up into different portions and generated in parallel using multiple headless browsers, each capturing screenshots of the different portions of the content at the same time. These screenshots can then be combined for a final result in the same or similar way as screenshots captured by a single headless browser are combined to make a video.

By way of example, and not limitation, a method according to the techniques described herein may include receiving a request to capture a video of content generated or displayed by an application. For instance, the application may be a web-based application (e.g., a dynamic web application) that generates and displays, among other things, a data visualization associated with a vehicle traversing an environment. That is, the application may receive log data or other sensor data associated with the vehicle and generate the data visualization based at least in part on the received log data or sensor data. In some examples, the request to capture the video may be received at a remote server and from a user device, and the server may be configured to generate the video on behalf of the user device.

In some examples, a headless browser may be opened to access the application. For instance, based at least in part on the request, the server may open a headless browser to access the application and generate at least a portion of the content. Additionally, the server may cause the headless browser to capture image data associated with respective frames of the content (e.g., a window of the application as viewed through a graphical user interface). For example, the headless browser may load a first frame of the content that is associated with a first instance of time and capture a first screenshot of the first frame, then load a second frame of the content that is associated with a second instance of time and capture a second screenshot of the second frame, and so forth until a screenshot for each frame of the content has been captured. In some examples, one or more remote procedure calls (RPCs) may be used to cause the headless browser to capture the image data.

As used herein, a "frame," such as frame of content or a frame of a video, means a still image which can compose a part of a moving picture. That is, the moving picture may be composed of multiple frames and, when the moving picture is displayed, each individual frame may be flashed/displayed on a screen for a short time (e.g., $\frac{1}{24}$, $\frac{1}{25}$, $\frac{1}{30}$ of a second, referred to herein as a "frame interval") and then immediately replaced by the next one.

In some examples, a period of time between when consecutive screenshots of frames of the content are captured may be associated with a frame interval. The frame interval may correspond with a quality of the video in terms of how smooth or choppy the video appears from frame to frame. In at least one example, the headless browser or the server automating the headless browser may wait to capture screenshots until the application has finished loading. For instance, the headless browser or the server may wait until notifications of "loading spinners" associated with the application loading the content have been removed before capturing a screenshot. In some examples, a signal or instruction may be received indicating that a frame is loaded or has finished loading.

In some examples, a size (e.g., length of time, quality, etc.) may be determined that is associated with the video that is to be generated, the content that is to be recorded, and/or the like, and based at least in part on the size, multiple headless browsers may be opened in parallel to each access the application and generate different portions of the content at the same or substantially the same time. For instance, a first headless browser may access the application to capture screenshots associated with a first portion of the content, a second headless browser may access the application to capture screenshots associated with a second portion of the content, and so forth. In some instances, the number of headless browsers that may be opened in parallel may be directly proportionate to the size. Additionally, any number of headless browsers (e.g., 1, 2, 3, 4, 5, etc.) may be opened in parallel to expedite the video capturing process. Further, each headless browser may open the web-based application using one or more pages or tabs of the headless browser. For instance, the remote server may open a first instance of the web-based application in a first page of a first headless browser, open a second instance of the web-based application in a second page of the first headless browser, and so forth.

In some examples, if the content is to be split into different portions and assigned to different headless browsers and/or pages of a headless browser for capturing the screenshots, each portion of the different portions may be of an equal length, data size, processing time, and/or the like. By way of example, if the content is split up to different headless browsers/pages based on data size, in some instances the length of the video generated by each headless browser may be different. Similarly, if the content is split up based on length of the video portion, then the data size of each portion of the video may be different. In this way, each of the headless browsers may finish generating the screenshots at the same time or close to the same time.

Based at least in part on the image data (e.g., screenshots) captured by the headless browser, the video may be generated (e.g., by the server). For instance, the individual screenshots may include timestamp data, and the screenshots may be combined together in order of their timestamps to generate the video. Additionally, or alternatively, the individual screenshots may be combined together in the order they were captured. In at least one example, after the video is generated, the video, a link to the video, and/or the like may be stored in a memory that is accessible to the user device that requested the video (e.g., a memory associated with the server, a memory associated with the user device, a memory located in the cloud, etc.).

In some examples, data may be sent to the application indicating the specific content that is to be generated and/or displayed. For instance, the data may include a specific log data or sensor data file that the user device is requesting the video of. Additionally, the data may indicate one or more features that the content is to include when the application generates the content. For instance, if the content is a data visualization associated with a vehicle traversing an environment, then the data may indicate whether the data visualization should include detected objects in the environment (e.g., other cars, pedestrians, buildings, structures, etc.), detected road network information (e.g., lane markings, traffic signage, barriers, etc.), information associated with the vehicle (e.g., speed, RPMs, heading, power consumption, etc.), and the like. Additionally, or alternatively, the data may indicate a perspective from which the vehicle is to be viewed in the data visualization (e.g., a top-down perspective, a vehicle or first-person perspective, a second person perspective, a third person perspective, etc.).

In at least one example, the headless browser(s) may be configurable to capture a specific quality of screenshots, leading to the same quality of a requested video (e.g., if 4K quality screenshots are captured, the generated video may be 4K quality as well). For instance, one or more parameters of the headless browser(s) may be altered such that the captured image data is of a specific width, height, pixel ratio, resolution, etc. Additionally, the headless browser(s) may be configured to capture screenshots more or less frequently (e.g., increase or decrease a frame interval), resulting in a smoother or choppier video quality between frames.

In some examples, graphics processing unit (GPU) acceleration may be used to generate and/or display the content such that a video may be captured. GPU acceleration may speed up the time that it takes for the web-based application and/or the headless browser to load a frame of the content in order to capture a screenshot. In some examples, the web-based application and/or the server that is automating the video generation may be running on GPU nodes, and the headless browser may be configured to enable GPU acceleration. In this way, when the headless browser is loading the web-based application with visuals, the visuals may take advantage of the GPU(s) to speed up the process of loading the content.

In some examples, the web-based application may be a time-based application capable of deterministically rendering a frame of content at any given point in time. In some examples, the remote server may send indications of time to the web-based application to cause the web-based application to generate the content associated with the time sent by the remote server. The remote server may determine whether the web-based application has finished generating/rendering the content associated with each time, and then cause the headless browser to capture a screenshot of the content at that time. For instance, the remote may determine that the web-based application has finished generating/rendering the content associated with a specific time if there are no loading spinners present on the web-based application, or the like.

These and other aspects are described further below with reference to the accompanying drawings. The drawings are merely example implementations and should not be construed to limit the scope of the claims. For example, while the example vehicles are shown and described as being autonomous vehicles that are capable of navigating between locations without human control or intervention, techniques described herein are also applicable to non-autonomous and/or semi-autonomous vehicles. Additionally, while the videos generated using the headless browser techniques described herein are described with respect to generating videos of content associated with vehicles, the disclosed techniques may be used to generate videos in many other contexts. For instance, the disclosed techniques may be used to generate videos of any content that may be generated and/or displayed by a dynamic web-based application, as well as other web-based technologies.

FIG. 1 is a pictorial flow diagram illustrating an example process 100 in which a web-based application 108 is generating and/or displaying content 112 based on log data 104, and a headless browser 116 is used to capture a video 134 of the content 112. The log data 104 may be associated with a vehicle 102 that is or was traversing an environment 106. In some instances, the vehicle 102 may be a simulated vehicle, the environment 106 may be a simulated environment, and the log data 104 may be simulated log data. The log data 104 may be sensor data (e.g., image data, lidar data, radar data, etc.) captured by a sensor system of the vehicle 102.

The web-based application 108 may receive the log data 104 associated with the vehicle 102 and generate content 112 associated with the vehicle 102, such as the data visualization shown in FIG. 1. The content 112 generated by the web-based application 108 may be viewable through a graphical user interface (GUI) 110. For instance, a user device may open a web browser and access the web-based application 108 to view the content 112. In various examples, the content 112 may include a data visualization (e.g., a digital representation of the vehicle 102 and a digital representation of the environment 106 that the vehicle 102 is operating in). Accordingly, a data visualization may include one or more objects detected within the environment 106, such as other vehicles, pedestrians, cyclists, buildings, structures, and the like. The data visualization may also include lane markings, traffic signage, crosswalk markings, and the like.

The computing device(s) 114 may access, simulate, or automate the web-based application 108 using a headless browser 116 and capture screenshots 118 of the content 112. For instance, the computing device(s) 114 may, using the headless browser 116, cause the web-based application 108 to load a first frame of the content 112 at a time $t_0$ 120, and after the web-based application 108 has finished loading the first frame of the content 112, the computing device(s) 114 may cause the headless browser 116 to capture a screenshot 122 of the content 112 at the time $t_0$ 120. After capturing the screenshot 122 of the content 112 at the time $t_0$ 120, the computing device(s) 114 may then cause the web-based application 108 to load a second frame of the content 112 at a time $t_1$ 124 (which may be a frame interval 132 after time $t_0$ 120). After the web-based application 108 has finished loading the second frame of the content 112, the computing device(s) 114 may cause the headless browser 116 to capture a screenshot 126 of the content 112 at the time $t_1$ 124.

The computing device(s) 114 may continue to repeat this process to capture the screenshot 130 at a time $t_2$ 128 (which may be the frame interval 132 after time $t_1$ 124), and further continue this process until screenshots 118 for the entire length of the video 134 or the content 112 have been captured. Using the captured screenshots 118, the computing device(s) 114 may then generate the video 134. For instance, the computing device(s) 114 may combine the screenshots 118 to generate the video 134.

Figure 2:
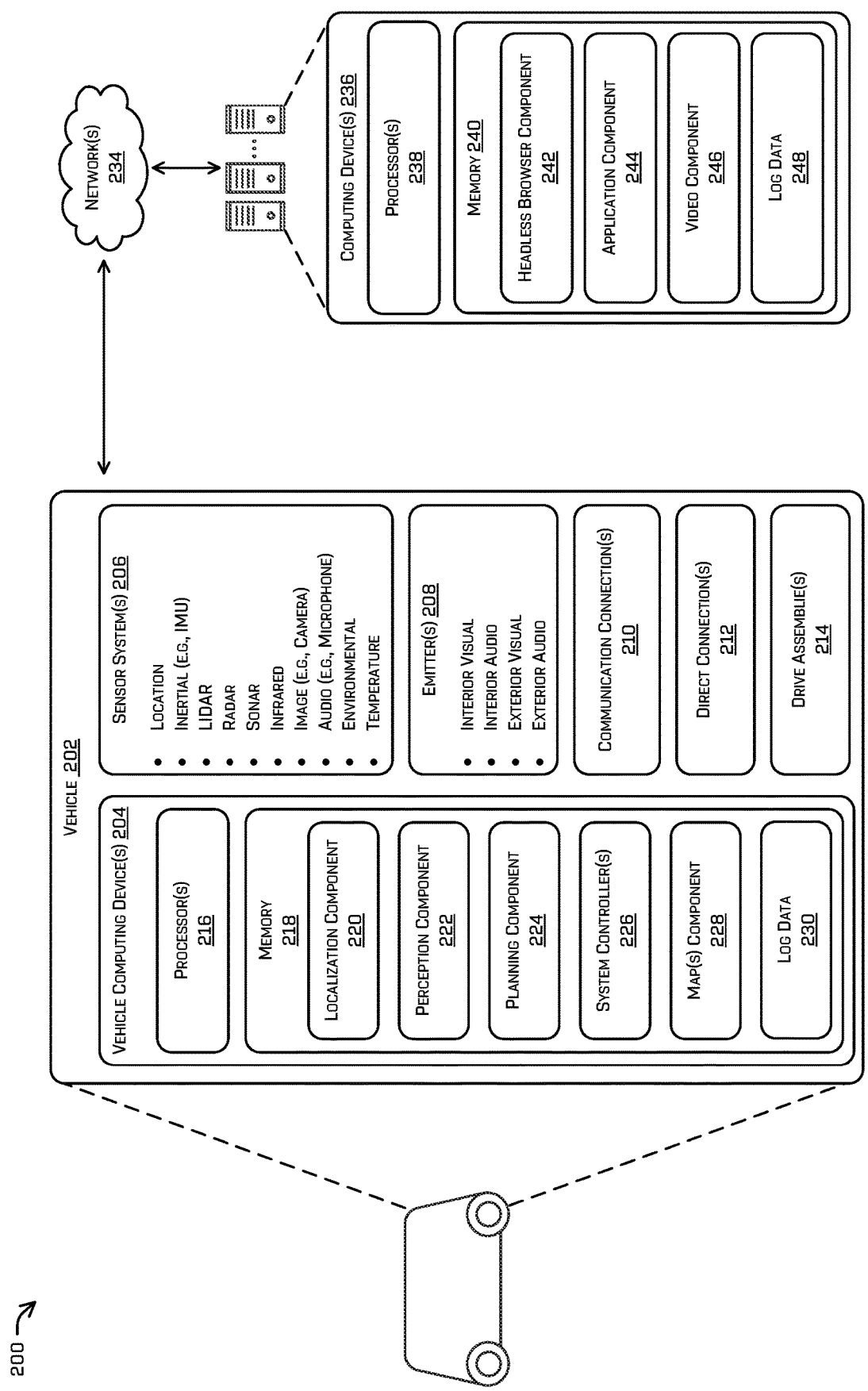
FIG. 2 is a block diagram illustrating an example system for implementing some of the various technologies described herein.

FIG. 2 is a block diagram illustrating an example system 200 for implementing some of the various technologies described herein. In some examples, the system 200 may include one or multiple features, components, and/or functionality of examples described herein with reference to other figures.

The system 200 may include a vehicle 202. In some examples, the vehicle 202 may include some or all of the features, components, and/or functionality described above with respect to the vehicle 102. For instance, the vehicle 202 may comprise a bidirectional vehicle. As shown in FIG. 2, the vehicle 202 may also include a vehicle computing device 204, one or more sensor systems 206, one or more emitters 208, one or more communication connections 210, one or more direct connections 212, and/or one or more drive assemblies 214.

The vehicle computing device 204 can, in some examples, include one or more processors 216 and memory 218 communicatively coupled with the one or more processors 216. In the illustrated example, the vehicle 202 is an autonomous vehicle; however, the vehicle 202 could be any other type of vehicle (e.g., automobile, truck, bus, aircraft, watercraft, train, etc.), or any other system having components such as those illustrated in FIG. 2 (e.g., a robotic system, an automated assembly/manufacturing system, etc.). In examples, the one or more processors 216 may execute instructions stored in the memory 218 to perform one or more operations on behalf of the one or more vehicle computing devices 204.

The memory 218 of the one or more vehicle computing devices 204 can store a localization component 220, a perception component 222, a planning component 224, one or more system controllers 226, a map(s) component 228, and log data 230. Though depicted in FIG. 2 as residing in memory 218 for illustrative purposes, it is contemplated that the localization component 220, perception component 222, planning component 224, one or more system controllers 226, map(s) component 228, and/or the log data 230 can additionally, or alternatively, be accessible to the vehicle 202 (e.g., stored on, or otherwise accessible from, memory remote from the vehicle 202, such as memory 240 of one or more computing devices 236).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 206 or received from one or more other devices (e.g., computing devices 236) to accurately determine a location of the autonomous vehicle. In some instances, the localization component 220 can provide data to various components of the vehicle 202 to determine an initial position of the autonomous vehicle for generating a trajectory and/or for determining to retrieve map data. In various examples, the localization component 220 can provide data to a web-based application that may generate a data visualization associated with the vehicle 202 based at least in part on the data.

In some instances, the perception component 222 can include functionality to perform object tracking, detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 222 may provide data to a web-based application that generates a data visualization associated with the vehicle 202 based at least in part on the data.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In at least one example, the vehicle computing device 204 can include one or more system controllers 226, which can be configured to control steering, propulsion, braking, safety, emitters, communication, components, and other systems of the vehicle 202. These system controller(s) 226 can communicate with and/or control corresponding systems of the drive assembly(s) 214 and/or other components of the vehicle 202.

The memory 218 can further include the map(s) component 228 to maintain and/or update one or more maps (not shown) that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 202 can be controlled based at least in part on the maps. That is, the maps can be used in connection with the localization component 220, the perception component 222, and/or the planning component 224 to determine a location of the vehicle 202, identify objects in an environment, and/or generate routes and/or trajectories to navigate within an environment. Additionally, the maps can be used in connection with the web-based application to generate content associated with the vehicle 202, such as a data visualization.

In some examples, the one or more maps can be stored on a remote computing device(s)(such as the computing device(s) 236) accessible via one or more network(s) 234. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 218 may also store log data 230 associated with the vehicle. For instance, the log data 230 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 230.

In some instances, aspects of some or all of the memory-stored components discussed herein can include any models, algorithms, and/or machine learning algorithms. For example, in some instances, components in the memory 218 (and the memory 240, discussed in further detail below) such as the localization component 220, the perception component 222, and/or the planning component 224 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 206 can include multiple instances of each of these or other types of sensors. For instance, the lidar sensors can include individual lidar sensors located at the corners, front, back, sides, and/or top of the vehicle 202. As another example, the image sensors can include multiple image sensors disposed at various locations about the exterior and/or interior of the vehicle 202. As an even further example, the audio sensors can include multiple audio sensors disposed at various locations about the exterior and/or interior of the vehicle 202. Additionally, the audio sensors can include an array of a plurality of audio sensors for determining directionality of audio data. The sensor system(s) 206 can provide input to the vehicle computing device 204. Additionally, or alternatively, the sensor system(s) 206 can send sensor data, via the one or more networks 234, to the one or more computing device(s) 236 at a particular frequency, after a lapse of a predetermined period of time, in near real-time, etc.

The vehicle 202 can also include one or more emitters 208 for emitting light and/or sound. The emitters 208 in this example include interior audio and visual emitters to communicate with passengers of the vehicle 202. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive assembly(s) 214. Also, the communication connection(s) 210 can allow the vehicle 202 to communicate with other nearby computing device(s) (e.g., other nearby vehicles, traffic signals, laptop computer 146, etc.). The communications connection(s) 210 also enable the vehicle 202 to communicate with a remote teleoperations system or other remote services.

The communications connection(s) 210 can include physical and/or logical interfaces for connecting the vehicle computing device(s) 204 to another computing device (e.g., computing device(s) 236) and/or a network, such as network(s) 234. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 212 of vehicle 202 can provide a physical interface to couple the one or more drive assembly(s) 214 with the body of the vehicle 202. For example, the direct connection 212 can allow the transfer of energy, fluids, air, data, etc. between the drive assembly(s) 214 and the vehicle 202. In some instances, the direct connection 212 can further releasably secure the drive assembly(s) 214 to the body of the vehicle 202.

In at least one example, the vehicle 202 can include one or more drive assemblies 214. In some examples, the vehicle 202 can have a single drive assembly 214. In at least one example, if the vehicle 202 has multiple drive assemblies 214, individual drive assemblies 214 can be positioned on opposite longitudinal ends of the vehicle 202 (e.g., the leading and trailing ends, the front and the rear, etc.).

The drive assembly(s) 214 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 214 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 214. Furthermore, the drive assembly(s) 214 may also include one or more communication connection(s) that enable communication by the respective drive assembly with one or more other local or remote computing device(s).

The computing device(s) 236 can include one or more processors 238 and memory 240 that may be communicatively coupled to the one or more processors 238. The memory 240 may store a headless browser component 242, an application component 244, a video component 246, and log data 248. In some examples, the computing device(s) 236 may be associated with a teleoperations system that remotely monitors a fleet of vehicles. Additionally, or alternatively, the computing devices(s) 236 may be leveraged by the teleoperations system to receive and/or process data on behalf of the teleoperations system.

The headless browser component 242 may be used to access a web-based application to capture screenshots of content displayed and/or generated by the web-based application. In some examples, the application component 244 may be associated with the web-based application. For instance, the application component 244 may receive or otherwise use the log data 248 to generate a data visualization that is displayed by the web-based application.

The video component 246 may receive the screenshots captured by the headless browser component 242 and generate videos using the screenshots. For instance, the video component 246 may combine the multiple screenshots into a video file. Additionally, the video component 246 may store generated videos that can be accessed for viewing.

In some examples, the memory 240 may include the log data 248. The log data 248 may include sensor data (e.g., image data, lidar data, radar data, etc.) captured by the sensor system 206 of the vehicle 202. Additionally, the log data 248 may include simulated sensor data for use in a simulation associated with the vehicle.

The processor(s) 216 of the vehicle 202 and the processor(s) 238 of the computing device(s) 236 can be any suitable processor capable of executing instructions to process data and perform operations as described herein. By way of example and not limitation, the processor(s) 216 and 238 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 240 are examples of non-transitory computer-readable media. The memory 218 and 240 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 3 is illustrated as a distributed system, in alternative examples, components of the vehicle 202 can be associated with the computing device(s) 236 and/or components of the computing device(s) 236 can be associated with the vehicle 202. That is, the vehicle 202 can perform one or more of the functions associated with the computing device(s) 236, and vice versa.

Figure 3A:
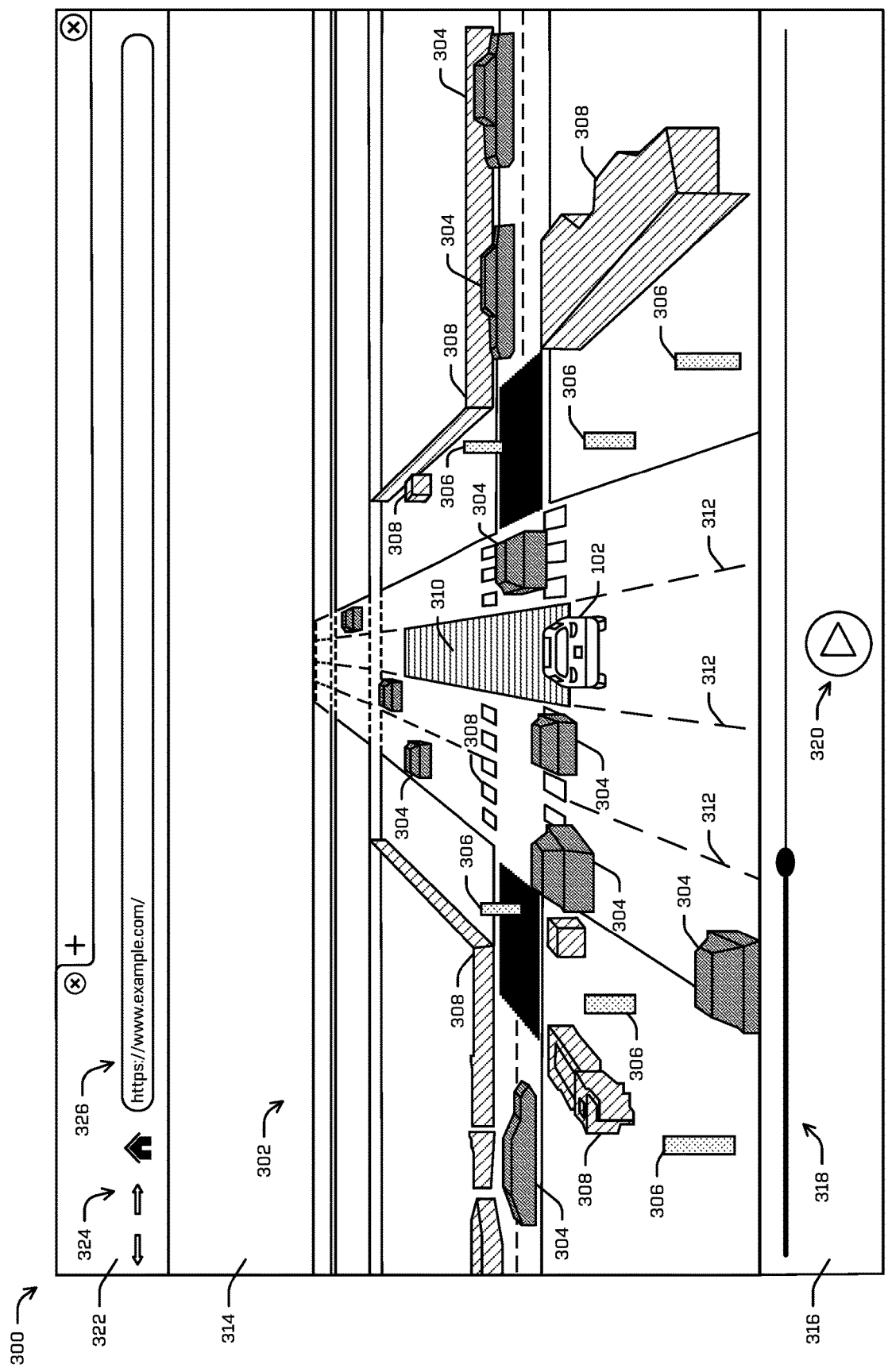
FIG. 3A illustrates an example browser view of a web-based application that is generating and/or displaying content based on log data associated with a vehicle.

FIG. 3A illustrates an example browser view of a web-based application as seen through a traditional web browser 300 (e.g., a web browser including a graphical user interface, and not a headless browser). The web-based application is generating and/or displaying content based on log data associated with a vehicle 102.

The content displayed/generated by the web-based application is an example data visualization 302 associated with the vehicle 102. The data visualization 302 may include a digital representation of the vehicle 102 as it traverses an environment, as well as, in some instances, a driving corridor 310 that is associated with a trajectory of the vehicle 102, as well as lane markings 312 and other features of the environment. Additionally, the data visualization 302 may include digital representations of objects that are disposed within the environment. Each of the objects may represent different types of objects, such as vehicle objects 304, bicyclist objects, pedestrian objects 306, and structure/building objects 308. For instance, if a detected type of object is another vehicle that is within the environment, the web-based application may generate the data visualization 302 such that the object appears as a vehicle agent 304. Similarly, if the detected type of object is a bicyclist or a pedestrian, the object may be generated/displayed as a bicyclist agent or pedestrian agent 306, respectively.

In some examples, the web-based application may generate/display different objects with different shapes, sizes, colors, etc. depending on the type of agent. For instance, vehicle objects 304 may be represented by a first color (e.g., blue), bicyclist objects may be represented by a second color (e.g., purple), pedestrian objects 306 may be represented by a third color (e.g., orange), and structure/building objects 308 may be represented by a third color (e.g., gray). As another example, a sedan may be represented by a first vehicle agent 304 that is a first size and/or shape associated with the sedan body style, a sport utility vehicle (SUV) may be represented by a second vehicle agent 304 that is a second size and/or shape associated with the SUV body style, a pickup truck may be represented by a third vehicle agent 304 that is a third size and/or shape associated with the pickup truck body style, and a semi-trailer truck may be represented by a fourth vehicle agent 304 that is a fourth size and/or shape associated with the semi-trailer truck body style. Further, although illustrated in FIG. 3A as three-dimensional (3D) rectangular blocks, 3D trapezoidal blocks, and 3D cylinders for simplicity, it is to be understood that other shapes and/or designs are contemplated for representing the various objects. For instance, if a detected object comprises a sedan-type vehicle, then the vehicle agent 304 representing the object may be in the shape of a sedan-type vehicle.

The web-based application, as displayed/generated on the web browser 300, may include a first portion 314 and a second portion 316. The first portion 314 may include the data visualization, and the second portion 316 may include one or more interface elements for interacting with the data visualization, such as a scrub bar 318 and a play/pause element 320. The web browser 300 may include a menu bar 322 having page back, page forward, and home interface elements 324, as well as a search bar 326.

Figure 3B:
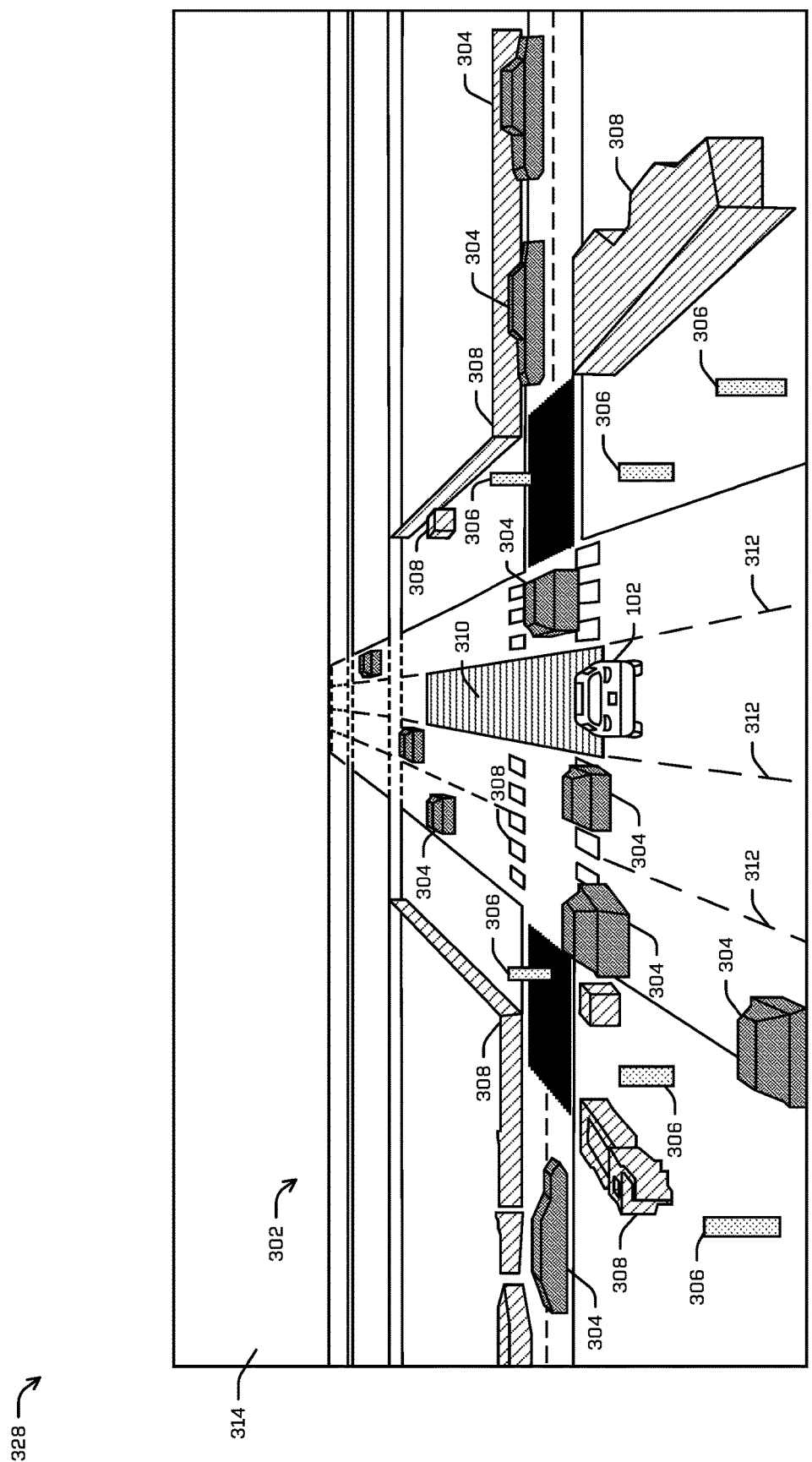
FIG. 3B illustrates an example frame of a video that may be captured based at least in part on the displayed/generated content described in FIG. 3A.

FIG. 3B illustrates an example frame of a video 328 that may be captured based at least in part on the displayed/generated content of the web-based application described in FIG. 3A. The video 328 may be captured using the headless browser techniques described herein. As such, the video 328 does not include the second portion 316 of the web-based application as displayed/generated on the web browser 300. Instead, the video 328 includes the first portion 314 including the data visualization 302. Additionally, the video 328 may include some or all of the features of the data visualization, such as the vehicle 102, the driving corridor 310, the lane markings 312, the vehicle objects 304, the pedestrian objects 306, and/or the structure/building objects 308.

Figure 4A:
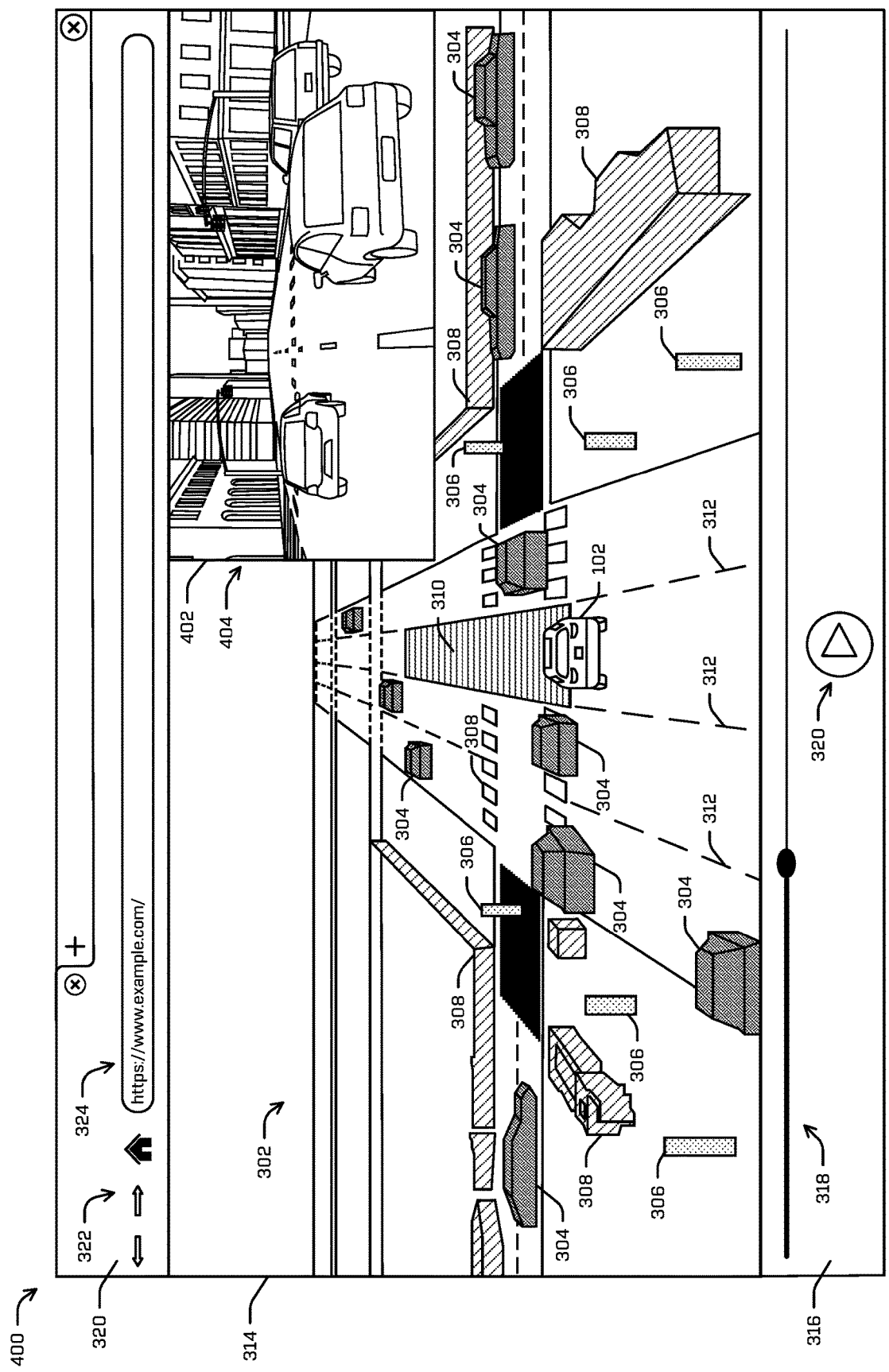
FIG. 4A illustrates another example browser view of a web-based application that is generating and/or displaying content using multiple different canvases of a web-browser window.

FIG. 4A illustrates another example browser view of a web-based application as seen through a traditional web browser 400 (e.g., a web browser including a graphical user interface, and not a headless browser). The web-based application is generating and/or displaying content based on log data associated with a vehicle 102. The content includes the data visualization 302 displayed in a first portion 314 of the web browser 400 and a video 404 displayed in a third portion 402 of the web browser 400. That is, the web-based application may generate/display the data visualization 302 in the first portion 314 of the web browser 400 and generate/display the video 404 in the third portion 402 of the web browser 400.

The data visualization 302 may include the digital representation of the vehicle 102, the driving corridor 310, the lane markings 312, and other features of the environment. Additionally, the data visualization 302 may include the digital representations of the objects that are disposed within the environment, such as vehicle objects 304, the pedestrian objects 306, and the structure/building objects 308.

The web-based application, as displayed/generated on the web browser 300, includes the first portion 314, the second portion 316, and the third portion 402. The second portion 316 includes the scrub bar 318 and the play/pause element 320 for controlling the data visualization 302 and/or the video 404.

The video 404 may be a video captured by a camera of the vehicle 102 while it is or was operating in the environment. That is, in some examples the video 404 (as well as the data visualization 302) may be a live video, and in other examples the video 404 may be a recorded video, or even a simulated video.

Figure 4B:
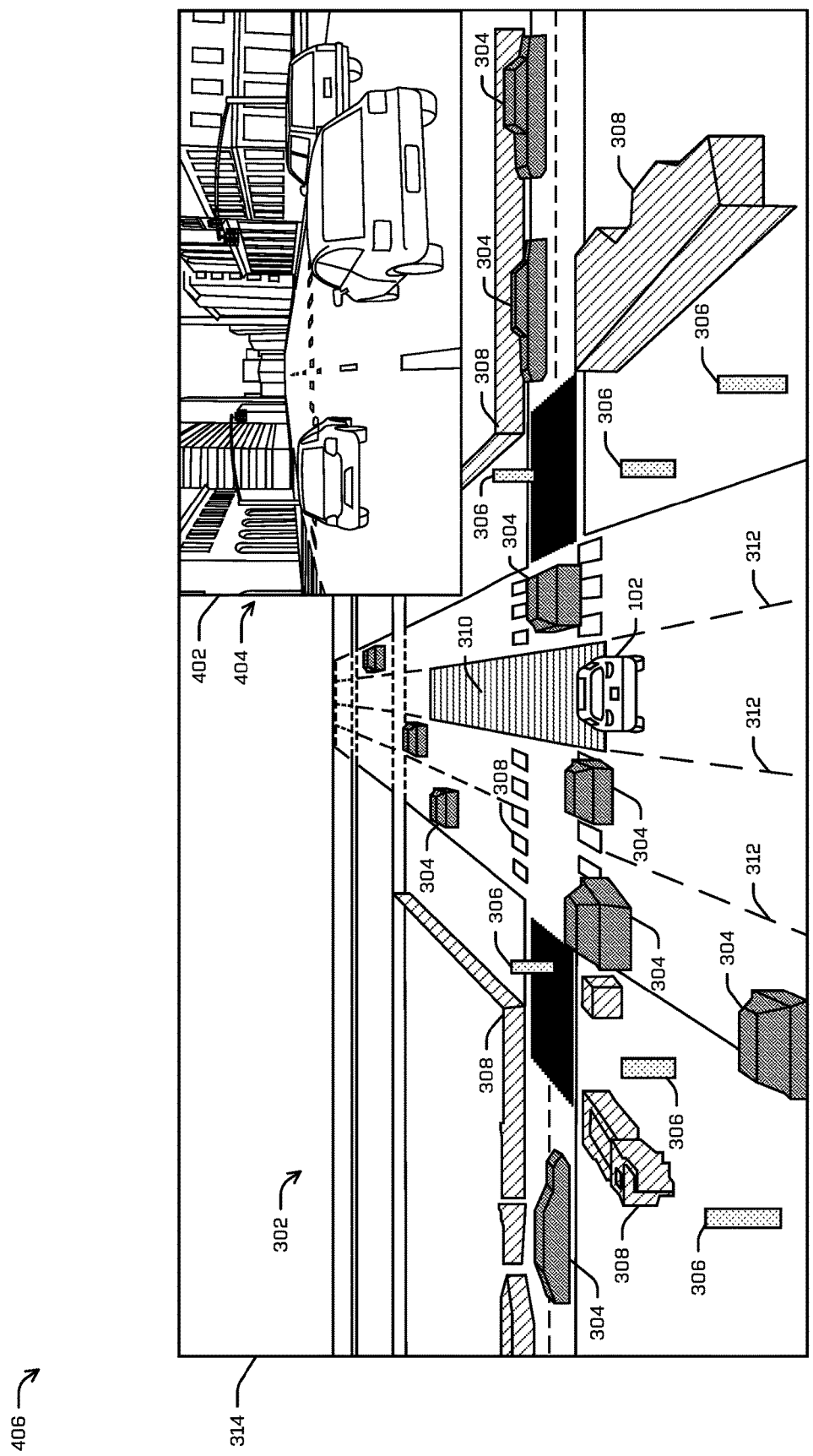
FIG. 4B illustrates an example frame of a video that may be captured based at least in part on the generated/displayed content described in FIG. 4A.

FIG. 4B illustrates an example frame of a video 406 that may be captured based at least in part on the generated/displayed content described in FIG. 4A. The video 406 may be captured using the headless browser techniques described herein. As such, the video 406 does not include the second portion 316 of the web-based application as displayed/generated on the web browser 300. Instead, the video 406 includes the first portion 314 including the data visualization 302, as well as the third portion 402 including the video 404. Additionally, the video 406 may include some or all of the features of the data visualization 302, such as the vehicle 102, the driving corridor 310, the lane markings 312, the vehicle objects 304, the pedestrian objects 306, and/or the structure/building objects 308. Because the video 406 is captured using the headless browser techniques described herein, there is no need to record the data visualization 302 separate from the video 404. Instead, screenshots of the first portion 314 showing the data visualization 302 and the third portion 402 showing the video 404 may be captured at the same time (e.g., one screenshot includes both the first portion 314 and the third portion 402).

Figure 5:
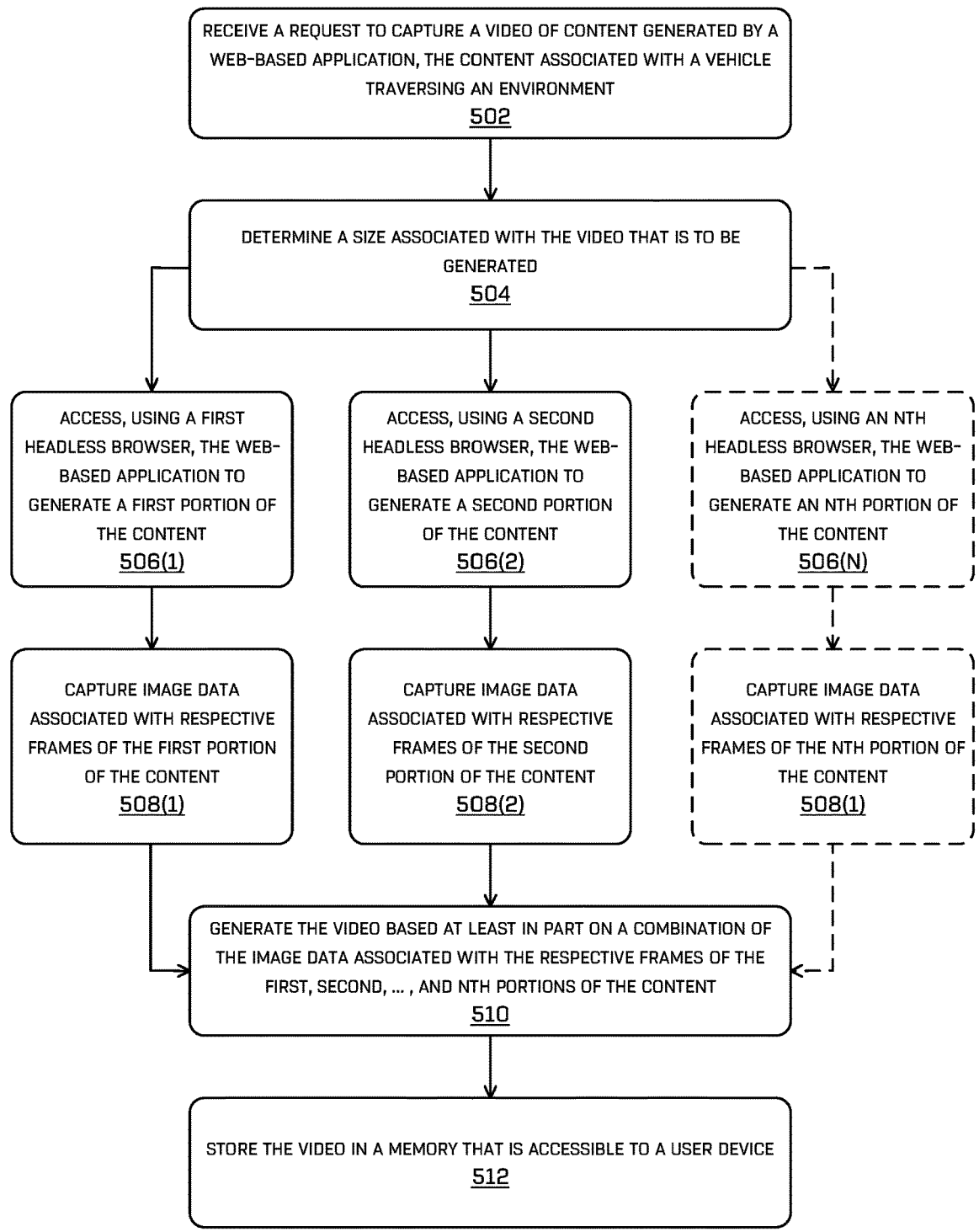
FIG. 5 is a flowchart illustrating an example method for using one or more headless browser(s) in parallel to capture a video of content generated and/or displayed by a web-based application.
Figure 6:
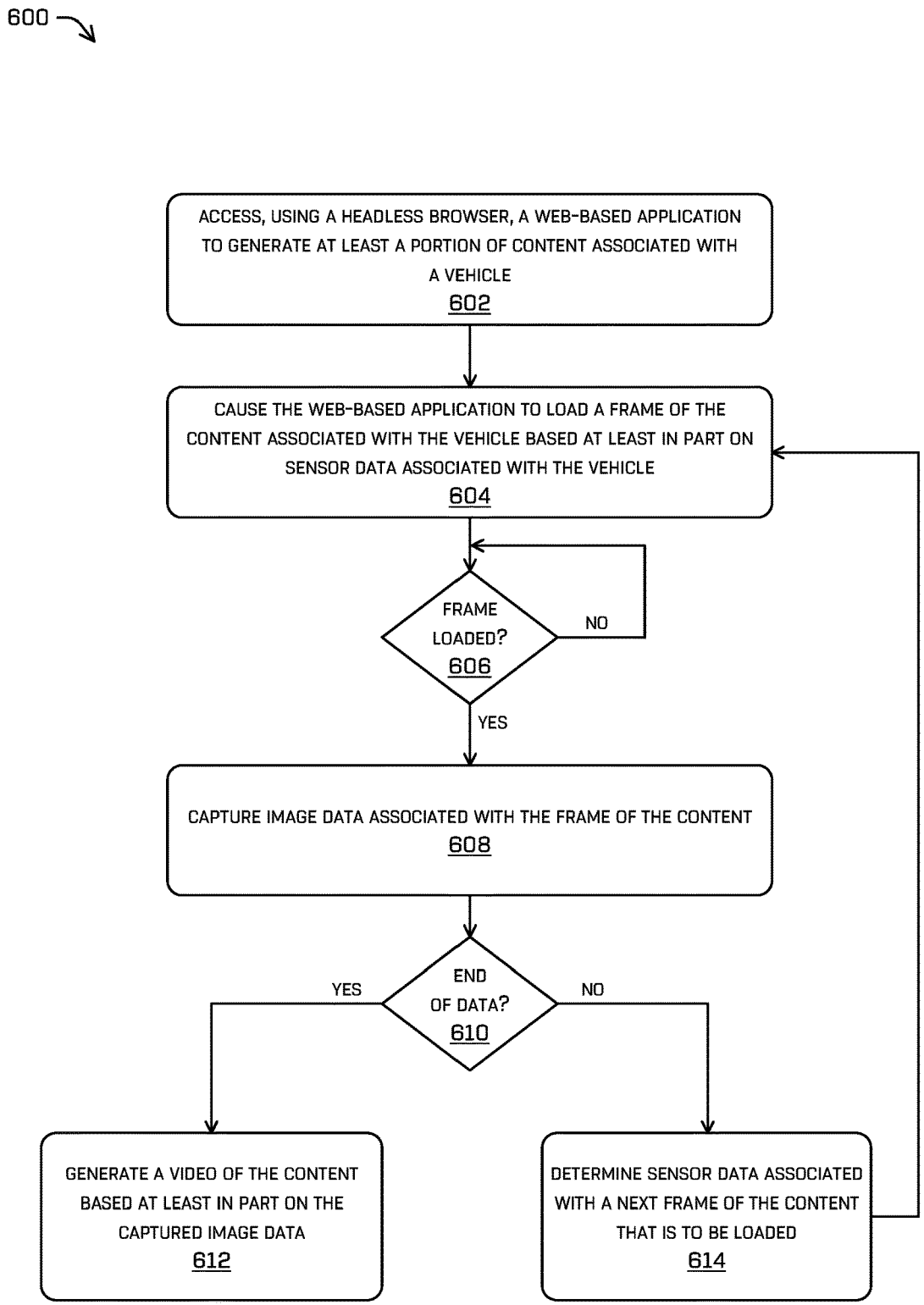
FIG. 6 is a flowchart illustrating an example method associated with using a headless browser to capture screenshots of content generated and/or displayed by a web-based application.

FIGS. 5 and 6 are flowcharts showing example methods of presenting various user interfaces on a display that are associated with monitoring a vehicle. The methods illustrated in FIGS. 5 and 6 are described with reference to one or more of the vehicles or systems described in FIGS. 1-4B for convenience and ease of understanding. However, the methods illustrated in FIGS. 5 and 6 are not limited to being performed using the vehicles and systems described in FIGS. 5 and 6, and may be implemented using any of the other vehicles, systems, and technologies described in this application, as well as vehicles, systems, and technologies other than those described herein. Moreover, the vehicles, systems, and technologies described herein are not limited to performing the methods illustrated in FIGS. 5 and 6.

The methods 500 and 600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 500 and 600 may be combined in whole or in part with each other or with other methods.

FIG. 5 is a flowchart illustrating an example method 500 for using one or more headless browser(s) in parallel to capture a video of content generated and/or displayed by a web-based application. The method 500 begins at operation 502, which includes receiving a request to capture a video of content generated by a web-based application, the content associated with a vehicle traversing an environment. For instance, the computing device(s) 114 may receive the request from a user device to capture the video 134 of the content 112 generated by the web-based application 108. Further, the content 112 may be associated with the vehicle 102 traversing the environment 106, and the content 112 may be generated based at least in part on log data 104 (e.g., sensor data) received from the vehicle 102.

At operation 504, the method 500 includes determining a size associated with the video that is to be generated. For instance, the computing device(s) 114 may determine a size associated with the video 134 that is to be generated. Additionally, or alternatively, the computing device(s) 114 may determine a size associated with the sensor data 104, a size associated with the content 112, and/or the like. In some examples, the size may be indicative of one or more of a duration of the video, a number of bytes associated with the video, a resolution of the video (e.g., high definition, 4K, 8K, etc.), a frame interval at which screenshots are to captured, and the like.

At operations 506(1), 506(2), and 506(N) (where N represents any number greater than or equal to one), the method 500 includes accessing the web based application using a first headless browser, a second headless browser, . . . , and/or an Nth headless browser in parallel to generate different portions of the content that is to be recorded. For instance, the first headless browser 116 may generate a first portion of the content 112 (e.g., 0-2 seconds), the second headless browser 116 may generate a second portion of the content 112 (e.g., 2-4 seconds), and so forth. That is, the first headless browser 116 may load individual frames of the first portion of the content 112, the second headless browser 116 may load individual frames of the second portion of the content 112, and so forth.

At operations 508(1), 508(2), and 508(N) (where N represents any number greater than or equal to one), the method 500 includes capturing image data associated with respective frames of the different portions of the content generated by the different headless browsers. For instance, the first headless browser 116 may capture image data associated with respective frames of the first portion of the content 112, the second headless browser 116 may capture image data associated with respective frames of the second portion of the content 112, and so forth. The first headless browser 116, the second headless browser 116, and/or the Nth headless browser 116 may capture the image data in parallel with each other.

At operation 510, the method 500 includes generating the video based at least in part on a combination of the image data associated with the respective frames of the first, second, . . . , and nth portions of the content. For instance, the computing device(s) 114 may receive the image data (e.g., screenshots 118) captured by the headless browsers 116 and combine the image data to generate the video (e.g., combine the screenshots in order to create the video). At operation 512, the method 500 includes storing the video in a memory that is accessible to a user device. For instance, the video, a link to the video, and/or the like may be stored at a memory location accessible to the user device that requested the video to be generated. The memory location may include a cloud storage location, a memory of the computing device(s) 114, a memory of the user device, and the like.

FIG. 6 is a flowchart illustrating an example method 600 associated with using a headless browser to capture screenshots of content generated and/or displayed by a web-based application. The method 600 begins at operation 602, which includes accessing, using a headless browser, a web-based application to generate at least a portion of content associated with a vehicle. For instance, the computing device(s) 114 may access the web-based application 108 (or simulate the web-based application 108) using a headless browser 116 to generate a first portion of content 112 associated with the vehicle 102 based on log data 104.

At operation 604, the method 600 includes causing the web-based application to load a frame of the content associated with the vehicle based at least in part on sensor data associated with the vehicle. For instance, the computing device(s) 114 and/or the headless browser 116 may cause the web-based application 108 to load a frame of the content 112 based at least in part on the log data 104 associated with the vehicle 102.

At operation 606, the method 600 includes determining whether the frame of the content has loaded. For instance, the computing device(s) 14 and/or the headless browser 116 may determine whether the web-based application 108 has finished loading the frame of the content 112. If the web-based application 108 has not finished loading the frame of the content 112, the method 600 may continue to wait and/or repeat operation 606 until the web-based application 108 has finished loading the frame. Once the web-based application 108 finishes loading the frame of the content 112, the method 600 proceeds on to operation 608.

At operation 608, the method 600 includes capturing image data associated with the frame of the content. For instance, the image data may be a screenshot 118 of the frame of the content 112. In some examples, the computing device(s) 114 may cause the headless browser 116 to capture the screenshot 118 of the frame of the content 112 using a remote procedure call (RPC). At operation 610, the method 600 includes determining whether the end of the data (e.g., the end of the log data file 104 and/or the content) has been reached. If the end of the data has been reached, the method 600 proceeds to operation 612, which includes generating a video of the content based at least in part on the captured image data. For instance, the computing device(s) 114 may generate the video 134 of the content 112 based at least in part on the screenshots 118.

If, however, the end of the content and/or the data has not been reached, the method 600 proceeds to operation 614, which includes determining sensor data associated with a next frame of the content that is to be loaded. For instance, the computing device(s) 114 may determine the sensor data (e.g., log data 104) associated with the next frame of the content 112 that is to be loaded by the web-based application 108. After determining the sensor data associated with the next frame, the method 600 proceeds to operation 604 to cause the web-based application to load the next frame of the content. The method 600 steps 604, 606, 608, and 610 may then repeat themselves until the end of the data and/or the content is reached.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A. A system comprising: one or more processors; and one or more non-transitory computer-readable media storing instructions that, when executed by the one or more processors, cause the system to perform operations comprising: receiving, at a server, a request to capture a video of content generated by a web-based application, the content including a data visualization associated with a vehicle traversing an environment, wherein the web-based application is configured to generate the content based at least in part on received sensor data associated with the vehicle; at least partially responsive to the request, accessing, by the server and using a headless browser, the web-based application to generate the content; causing, by the server, the headless browser to capture first image data representing a first frame of the content, the first frame generated by the web-based application based at least in part on first sensor data of the received sensor data; causing, by the server, the headless browser to capture second image data representing a second frame of the content, the second frame generated by the web-based application based at least in part on second sensor data of the received sensor data; receiving, at the server and from the headless browser, the first image data and the second image data; and generating, by the server, the video based at least in part on a combination of the first image data and the second image data.

B. The system as recited in paragraph A, wherein: the first frame is associated with a first instance of time, the second frame is associated with a second instance of time, and a period of time between the first instance of time and the second instance of time corresponds with a frame interval that is associated with a quality of the video.

C. The system as recited in any one of paragraphs A or B, the operations further comprising: sending the first sensor data to the web-based application; determining that the web-based application has finished generating the first frame of the content based at least in part on the first sensor data; and wherein causing the headless browser to capture the first image data is at least partially responsive to determining that the web-based application finished generating the first frame of the content.

D. The system as recited in any one of paragraphs A-C, wherein the headless browser is a first headless browser, the operations further comprising: determining, by the server, a size associated with the video that is to be generated; based at least in part on the size meeting or exceeding a threshold size, accessing, by the server and using a second headless browser, the web-based application to generate the content in parallel with the first headless browser; causing, by the server, the second headless browser to capture additional image data representing respective frames of the content; and wherein generating the video is further based at least in part on the additional image data.

E. A method comprising: receiving a request to capture a video of content generated by a web-based application; based at least in part on the request, causing a first headless browser to: access the application to generate a first portion the content; and capture image data associated with respective frames of the first portion of the content; receiving the image data from the headless browser; and generating the video based at least in part on a combination of the image data associated with the respective frames.

F. The method as recited in paragraph E, wherein the image data captured by the first headless browser comprises at least first image data and second image data, the first image data associated with a first frame of the first portion of the content, the second image data associated with a second frame of the first portion of the content.

G. The method as recited in any one of paragraphs E or F, further comprising determine that the application has finished loading a first frame of the respective frames, wherein causing the first headless browser to capture the image data is based at least in part on determining that the application loaded the first frame.

H. The method as recited in any one of paragraphs E-G, further comprising: determining a size associated with the video that is to be captured; based at least in part on the size meeting or exceeding a threshold size, causing a second headless browser to: access the application to generate a second portion the content; and capture additional image data associated with respective frames of the second portion of the content.

I. The method as recited in any one of paragraphs E-H, wherein generating the video is further based at least in part on a combination of the image data and the additional image data.

J. The method as recited in any one of paragraphs E-I, wherein the first headless browser and the second headless browser access the application and capture the image data and the additional image data during a same period of time.

K. The method as recited in any one of paragraphs E-J, wherein the request to generate the video is received from a user device, the method further comprising storing the video in a memory that is accessible to the user device.

L. The method as recited in any one of paragraphs E-K, wherein causing the first headless browser to capture the image data comprises sending a remote procedure call (RPC) request to the first headless browser, the RPC request associated with capturing a screenshot.

M. The method as recited in any one of paragraphs E-L, wherein the content includes a data visualization associated with a vehicle traversing an environment, the method further comprising sending, to the application, an indication of a specific data visualization that is to be generated, a level of detail that the data visualization is to include, or a perspective from which the vehicle is to be viewed in the data visualization.

N. The method as recited in any one of paragraphs E-M, further comprising configuring a parameter of the first headless browser such that the image data is of a specific resolution or pixel ratio.

O. The method as recited in any one of paragraphs E-N, wherein the content is generated by the web-based application based at least in part on sensor data, the sensor data comprising either sensor data captured by a real vehicle operating in an environment or simulated sensor data associated with a simulated vehicle.

P. One or more non-transitory computer-readable media storing instructions that, when executed by one or more processors, cause the one or more processors to perform operations comprising: receiving a request to capture a video of content generated by a web-based application; based at least in part on the request, causing a first headless browser to: access the application to generate a first portion the content; and capture image data associated with respective frames of the first portion of the content; receiving the image data from the headless browser; and generating the video based at least in part on a combination of the image data associated with the respective frames.

Q. The one or more non-transitory computer-readable media as recited in paragraph P, wherein the image data captured by the first headless browser comprises at least first image data and second image data, the first image data associated with a first frame of the first portion of the content, the second image data associated with a second frame of the first portion of the content.

R. The one or more non-transitory computer-readable media as recited in any one of paragraphs P or Q, the operations further comprising determine that the application has finished loading a first frame of the respective frames, wherein causing the first headless browser to capture the image data is based at least in part on determining that the application S. The one or more non-transitory computer-readable media as recited in any one of paragraphs P-R, the operations further comprising: determining a size associated with the video that is to be captured; based at least in part on the size meeting or exceeding a threshold size, causing a second headless browser to: access the application to generate a second portion the content; and capture additional image data associated with respective frames of the second portion of the content.

T. The one or more non-transitory computer-readable media as recited in any one of paragraphs P-S, wherein the first headless browser and the second headless browser access the application and capture the image data and the additional image data during a same period of time.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving, at a server, a request to capture a video of content generated by a web-based application, wherein:
the content includes a data visualization associated with a vehicle traversing an environment,
the web-based application is configured to generate the content based at least in part on received sensor data associated with the vehicle,
the request comprises a first indication of a feature of the data visualization,
the request comprises a second indication of a virtual perspective from which the vehicle is to be viewed in the data visualization, wherein the virtual perspective is different from a perspective of the received sensor data,
a portion of the received sensor data is processed to determine at least one characteristic of one or more objects within the environment or of the environment, wherein the portion and the at least one characteristic are determined based at least in part on the feature,
the data visualization, determined based at least in part on the feature, comprises at least one of digital representations of the environment or of the one or more objects within the environment, and
the digital representations comprise at least one of a shape, size, or color based at least in part on the at least one characteristic;
at least partially responsive to the request, accessing, by the server and using a headless browser, the web-based application to generate the content;
causing, by the server, the headless browser to capture first image data representing a first frame of the content, the first frame generated by the web-based application based at least in part on first sensor data of the received sensor data;
determining that the web-based application has finished generating the first frame of the content based at least in part on the first sensor data, and wherein causing the headless browser to capture the first image data is at least partially responsive to determining that the web-based application finished generating the first frame of the content;
causing, by the server, the headless browser to capture second image data representing a second frame of the content, the second frame generated by the web-based application based at least in part on second sensor data of the received sensor data;
receiving, at the server and from the headless browser, the first image data and the second image data; and
generating, by the server, the video based at least in part on a combination of the first image data and the second image data.

2. The system of claim 1, wherein:
the first frame is associated with a first instance of time,
the second frame is associated with a second instance of time, and
a period of time between the first instance of time and the second instance of time corresponds with a frame interval that is associated with a quality of the video.

3. The system of claim 1, wherein the headless browser is a first headless browser, the operations further comprising:
determining, by the server, a size associated with the video that is to be generated;
based at least in part on the size meeting or exceeding a threshold size, accessing, by the server and using a second headless browser, the web-based application to generate the content in parallel with the first headless browser;
causing, by the server, the second headless browser to capture additional image data representing respective frames of the content; and
wherein generating the video is further based at least in part on the additional image data.

4. The system of claim 3, wherein the size is based at least in part on at least one of a duration associated with a runtime of the video or a quality associated with the video.

5. The system of claim 1, further comprising determining that the first sensor data is not an end of the received sensor data, and wherein causing the headless browser to capture the second image data is based at least in part on the first sensor data not being the end of the received sensor data.

6. The system of claim 1, wherein the at least one characteristic comprises at least one of a classification, trajectory, tracking information, a presence of an entity in the environment, an association with an entity in the environment, a state of an entity in the environment, or an environmental condition.

7. A method comprising:
receiving a request to capture a video of content generated by a web-based application;
based at least in part on the request, causing a first headless browser to:
access the web-based application to generate a first portion of the content, wherein:
the content includes a data visualization associated with a vehicle traversing an environment,
the web-based application is configured to generate the content based at least in part on received sensor data associated with the environment,
the request comprises a first indication of a feature of the data visualization,
the request comprises a second indication of a virtual perspective from which the vehicle is to be viewed in the data visualization, wherein the virtual perspective is different from a perspective of the received sensor data:
a portion of the received sensor data is processed to determine at least one characteristic of one or more objects within the environment or of the environment, wherein the at least one characteristic is determined based at least in part on the feature, and
the data visualization, determined based at least in part on the feature, comprises at least one of digital representations of the environment or of the one or more objects within the environment; and
capture image data associated with respective frames of the first portion of the content;
determining that the web-based application has finished loading a first frame of the respective frames, wherein causing the first headless browser to capture the image data is based at least in part on determining that the web-based application loaded the first frame;
receiving the image data from the first headless browser; and
generating the video based at least in part on a combination of the image data associated with the respective frames.

8. The method of claim 7, wherein the image data captured by the first headless browser comprises at least first image data and second image data, the first image data associated with a first frame of the first portion of the content, the second image data associated with a second frame of the first portion of the content.

9. The method of claim 7, further comprising:
determining a size associated with the video that is to be captured; and
based at least in part on the size meeting or exceeding a threshold size, causing a second headless browser to:
access the web-based application to generate a second portion of the content; and
capture additional image data associated with respective frames of the second portion of the content.

10. The method of claim 9, wherein generating the video is further based at least in part on the additional image data.

11. The method of claim 9, wherein the first headless browser and the second headless browser access the web-based application and capture the image data and the additional image data during a same period of time.

12. The method of claim 7, wherein the request to generate the video is received from a user device, the method further comprising storing the video in a memory that is accessible to the user device.

13. The method of claim 7, wherein causing the first headless browser to capture the image data comprises sending a remote procedure call (RPC) request to the first headless browser, the RPC request associated with capturing a screenshot.

14. The method of claim 7, further comprising sending, to the web-based application, a third indication of a specific data visualization that is to be generated, or a level of detail that the data visualization is to include.

15. The method of claim 7, further comprising configuring a parameter of the first headless browser such that the image data is of a specific resolution or pixel ratio.

16. The method of claim 7, wherein the content is generated by the web-based application based at least in part on sensor data, the sensor data comprising either captured sensor data captured by a real vehicle operating in an environment or simulated sensor data associated with a simulated vehicle.

17. One or more non-transitory computer-readable media storing instructions that, when executed by one or more processors, cause the one or more processors to perform operations comprising:
  receiving a request to capture a video of content generated by a web-based application;
  based at least in part on the request, causing a first headless browser to:
    access the web-based application to generate a first portion of the content wherein:
      the content includes a data visualization associated with a vehicle traversing an environment,
      the web-based application is configured to generate the content based at least in part on received sensor data associated with the environment,
      the request comprises a first indication of a feature of the data visualization,
      the request comprises a second indication of a virtual perspective from which the vehicle is to be viewed in the data visualization, wherein the virtual perspective is different from a perspective of the received sensor data,
      a portion of the received sensor data is processed to determine at least one characteristic of one or more objects within the environment or of the environment, wherein the portion is determined based at least in part on the feature, and
      the data visualization, determined based at least in part on the feature, comprises, at least one of digital representations of the environment or of the one or more objects within the environment; and
    capture image data associated with respective frames of the first portion of the content;
  determining that the web-based application has finished loading a first frame of the respective frames, wherein causing the first headless browser to capture the image data is based at least in part on determining that the web-based application finished loading the first frame;
  receiving the image data from the first headless browser; and
  generating the video based at least in part on a combination of the image data associated with the respective frames.

18. The one or more non-transitory computer-readable media of claim 17, wherein the image data captured by the first headless browser comprises at least first image data and second image data, the first image data associated with a first frame of the first portion of the content, the second image data associated with a second frame of the first portion of the content.

19. The one or more non-transitory computer-readable media of claim 17, the operations further comprising:
  determining a size associated with the video that is to be captured; and
  based at least in part on the size meeting or exceeding a threshold size, causing a second headless browser to:
    access the web-based application to generate a second portion of the content; and
    capture additional image data associated with respective frames of the second portion of the content.

20. The one or more non-transitory computer-readable media of claim 19, wherein the first headless browser and the second headless browser access the web-based application and capture the image data and the additional image data during a same period of time.

* * * * *